United States Patent [19]

Lane et al.

[11] Patent Number: 4,694,190
[45] Date of Patent: Sep. 15, 1987

[54] INTEGRAL GENERATOR HOUSING AND BASE FOR A TURBINE GENERATOR

[75] Inventors: Bruce B. Lane, Westford; Douglas F. Westerkamp, Harvard; Peter P. Clifford, Leominster, all of Mass.

[73] Assignee: General Electric Company, Schenectady, N.Y.

[21] Appl. No.: 811,982

[22] Filed: Dec. 23, 1985

[51] Int. Cl.[4] .................................................. H02K 7/18
[52] U.S. Cl. .................................... 290/52; 290/1 A; 290/2; 248/679; 248/678; 60/687
[58] Field of Search ................ 290/1 R, 1 A, 52, 2; 248/672, 673, 674, 678, 679; 60/686, 687, 39.31

[56] References Cited

U.S. PATENT DOCUMENTS

| | | | |
|---|---|---|---|
| 684,201 | 10/1901 | Dick | 248/679 X |
| 2,007,795 | 7/1935 | Dickson | 290/1 A |
| 2,273,225 | 2/1942 | Semar | 60/687 |
| 2,317,062 | 4/1943 | Jervis | 290/2 X |
| 3,147,599 | 9/1964 | Frankel | 60/687 |
| 3,148,282 | 9/1964 | Hoffman | 290/52 |
| 3,185,854 | 5/1965 | Hoffman | 290/52 |
| 3,186,176 | 6/1965 | Edminson et al. | 60/687 |
| 3,418,485 | 12/1968 | Anderson et al. | 290/52 X |
| 3,453,443 | 7/1969 | Stoeckly | 290/52 X |
| 3,719,045 | 3/1973 | Hoffman | 60/95 A |
| 3,742,241 | 6/1973 | Gate et al. | 290/52 |
| 3,791,682 | 2/1974 | Mitchell | 290/52 X |
| 3,799,461 | 3/1974 | Skeen et al. | 248/678 X |
| 4,134,562 | 1/1979 | Paakkinen et al. | 248/679 X |
| 4,174,482 | 11/1979 | Bollman | 248/679 X |
| 4,501,973 | 2/1985 | Fenemore et al. | 290/1 A |

Primary Examiner—William M. Shoop, Jr.
Assistant Examiner—Shik LuenPaul Ip
Attorney, Agent, or Firm—Jerome C. Squillaro

[57] ABSTRACT

A turbine generator includes a plurality of spaced and parallel, transverse webs interconnected by plates to define an integral generator housing-base. Each transverse web in the generator section thereof includes a central, circular opening through which the generator rotor extends, and a plurality of apertures extending about the opening. Each transverse web further includes a walkway flange which, in association with the plates, forms a walkway, and also includes a superstructure lattice at the top thereof for supporting air cooling structure. A turbine is bolted to the integral generator housing-base, and is coupled to the generator rotor. Due to the integral generator housing-base, resonant vibrations of the base portion thereof at the generator operating frequency and at twice the generator operating frequency are eliminated, the weight and size of the turbine generator are reduced, and the turbine generator has greater structural integrity and rigidity.

9 Claims, 8 Drawing Figures

INTEGRAL GENERATOR HOUSING AND BASE FOR A TURBINE GENERATOR

BACKGROUND OF THE INVENTION

The present invention relates generally to turbine generators and, more particularly, to a generator housing and base assembly for a turbine generator.

Turbine generators commonly include a generator having a stator which supplies the power, and a rotor supplied with DC current from an exciter and operatively associated with the stator. The stator is mounted in a generator housing. The rotor is rotationally driven by a turbine, which also forms part of the turbine generator.

Conventionally, the turbine and the generator are each bolted to a base. In particular, the base is provided with a plurality of openings, a lower part of the generator fitting within a generator opening and a lower part of the turbine fitting within a turbine opening. The generator and turbine are individually bolted to the base in their respective openings. The generator and turbine are also operatively coupled to each other, so that the turbine drives the rotor.

The base is generally formed by a plurality of transverse webs which define the openings and stiffen the regions between the openings, with plates being welded to the webs to form a box-like structure. The generator includes a housing similarly formed by a plurality of transverse webs which support the generator structure, the webs being welded to plates to form a box-like structure. The generator housing is then bolted to the base within the generator opening.

Various problems arise with such connection of the generator to the base. The desirability of reducing the amount of vibration in a turbine generator is well known. However, a corner-to-corner vibration of the base at certain operating frequencies of the generator causes the transmission of undesirable Structureborne vibration therefrom. Specifically, a flapping mode of vibration is detectable at a corner of the base adjacent the generator.

A stiffening structure may be added to the base. Such structure is generally added in the form of a first supporting gusset extending along the bottom of the base from the flapping corner of the generator opening to the flapping corner of the base, and a second supporting gusset extending along the bottom of the base from the flapping corner of the generator opening to the center of the generator opening. The second supporting gusset is secured to the bottom of the generator housing that fits within the generator opening. In addition, lumped masses may be installed at the corners of the base to detune the structure for a particular range of frequencies. However, such stiffening structure and lumped masses do not provide an efficient solution to vibration reduction. In addition, the stiffening structure and lumped masses increases the weight and size of the turbine generator.

Further, since the base and the generator housing are constructed independently of each other, the transverse webs of the base and the generator housing are generally not in alignment; that is, although the base and housing webs are parallel to each other, they are generally offset with respect to each other. The offset reduces continuity of the structure and produces a design which is capable of a less than optimum weight utilization.

OBJECTS AND SUMMARY OF THE INVENTION

Accordingly, it is an object of the present invention to provide a turbine generator which reduces the amount of vibration generated therein.

It is another object of the present invention to provide a turbine generator having improved structural rigidity.

It is still another object of the present invention to provide a turbine generator having decreased weight.

It is yet another object of the present invention to provide a turbine generator having improved structural integrity.

It is a further object of the present invention to provide a turbine generator of reduced size.

It is a still further object of the present invention to provide a turbine generator in which the generator and base are formed as an integral assembly.

In accordance with an aspect of the present invention, a turbine generator comprises an integral generator housing-base including a base having a bottom and a generator housing having an upper end, the integral generator housing-base being formed by a plurality of spaced and parallel transverse webs and plates interconnecting the transverse webs, a first set of the transverse webs extending from the bottom to the upper end to integrally form both the base and the generator housing; a turbine; means for mounting the turbine on the integral generator housing-base; a generator stator mounted within the generator housing; and a generator rotor coupled to the turbine and operatively associated with the generator stator.

In accordance with another aspect of the present invention, a turbine generator of the type including a turbine; a generator stator and a generator rotor coupled to the turbine and operatively associated with the generator stator, an integral generator housing-base comprises a base having a bottom; a generator housing having an upper end; the integral generator housing-base being formed by a plurality of spaced and parallel transverse webs and plates interconnecting the transverse webs; and a first set of the transverse webs extending from the bottom of the base to the upper end of the generator housing to integrally form both the base and the generator housing.

Briefly stated, there is provided a turbine generator including a plurality of spaced and parallel, transverse webs interconnected by plates to define an integral generator housing-base. Each transverse web in the generator section thereof includes a central, circular opening through which the generator rotor extends, and a plurality of apertures extending about the opening. Each transverse web further includes a walkway flange which, in association with the plates, forms a walkway, and also includes a superstructure lattice at the upper end thereof for supporting air cooling structure. A turbine is bolted to the integral generator housing-base, and is coupled to the generator rotor. Due to the integral generator housing-base, resonant vibrations of the base portion thereof at the generator operating frequency and at twice the generator operating frequency are eliminated, the weight and size of the turbine generator are reduced, and the turbine generator has greater structural integrity and rigidity.

The above, and other objects, features and advantages of the present invention will become readily apparent from the following detailed description of the invention which is to be read in connection with the accompanying drawings.

DETAILED DESCRIPTION OF A PREFERRED EMBODIMENT

Figure 1A:
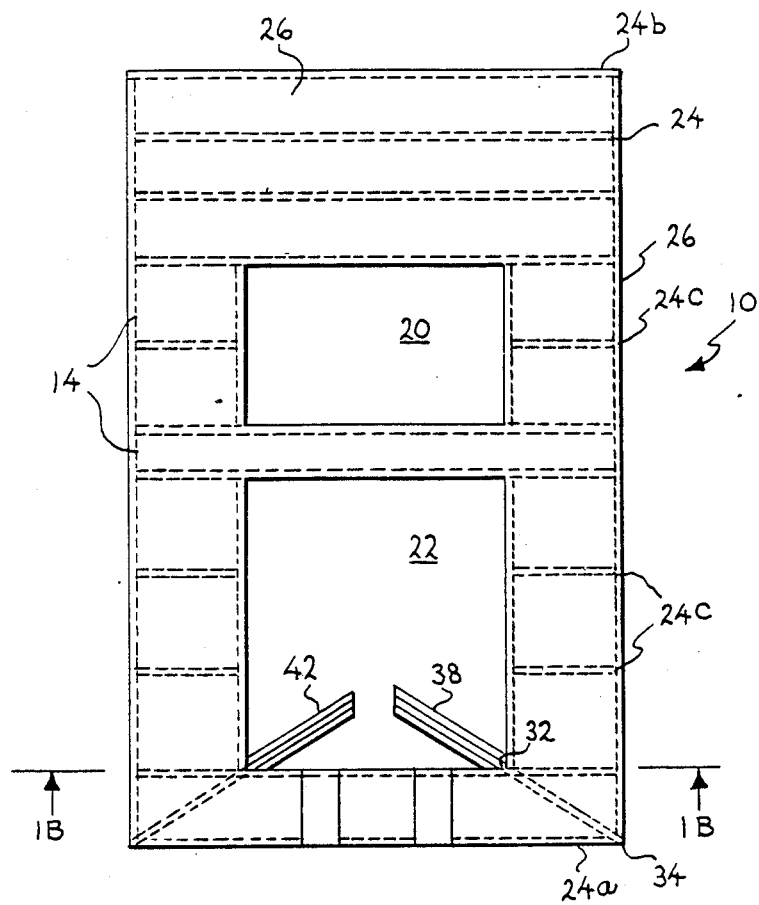
FIG. 1A is a perspective view of a base for a turbine generator according to the prior art.
Figure 1B:
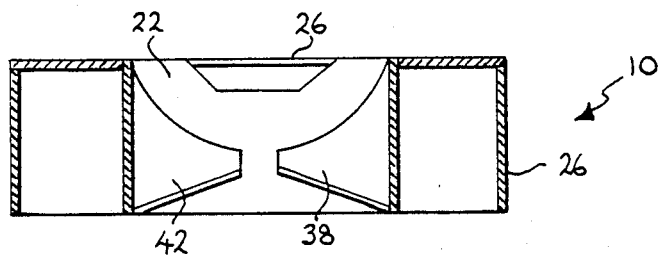
FIG. 1B is a cross section taken along IB—IB of FIG. 1.

Referring to FIG. 1, a base 10 of a conventional turbine generator according to the prior art includes a pair of openings 14, within which the turbine and generator (not shown) are bolted. Base 10 is, in turn, secured to a foundation (not shown) whose nature is not of concern to the present invention.

In particular, pair of openings 14 includes a turbine opening 20 within which the turbine is bolted and a generator opening 22 within which the generator is bolted, the turbine and generator are operatively connected to each other. Turbine opening 20 and generator opening 22 are preferably of a square or rectangular configuration.

Base 10 is formed by a plurality of transverse webs 24, including two end transverse webs 24a and 24b, and a plurality of intermediate transverse webs 24c shown in dashed line. Transverse webs 24 are surrounded by plates 26 welded thereto which define the box-like configuration shown. A generator housing (not shown) is likewise formed by a plurality of transverse webs having plates welded thereto. The generator housing is then bolted to base 10 within its respective generator opening 22.

In this embodiment, resonant vibrations are set up in base 10 at the generator operating frequency and twice the generator operating frequency. One cause of vibration at twice the generator operating frequency results from egg-shaped deformation of the generator stator produced by a rotating magnetic field rotating at the speed of rotation of the rotor. This rotating egg-shaped deformation sets up undesirable vibrations in the stator and, in turn, the generator housing. In order to avoid excessive stress on the generator housing, the stator is therein mounted by spring bars (not shown).

One form of resonant vibrations set up in base 10 may occur in a corner-to-corner flapping mode. Specifically, a twisting or flapping of base 10 may occur between a corner 32 of generator opening 22 and an adjacent corner 34 of base 10. The undesirable resonant vibrations are transmitted from base 10 to the foundation.

A stiffening structure such as, for example, reinforcing gussets may be added to base 10 to reduce such vibrations. In particular, a first reinforcing gusset 38 extends along the bottom of base 10 between corner 32 of generator opening 22 and corner 34 of base 10, as also shown in dashed line, and is welded at each end to transverse web 24 and an associated intermediate transverse web 24c. In addition, a second reinforcing gusset 42 extends along the bottom of base 10 in cantilevered fashion from corner 32 of generator opening 22 to the center of generator opening 22, and is welded at one end to the same intermediate transverse web 24c to which first reinforcing gusset 38 is welded and to the bottom of the generator housing (not shown).

Such a reinforcing structure detunes the structure by shifting its resonant frequencies to frequency regions in which a substantial reduction in excitation frequencies exist.

However, such reinforcing or stiffening structure still fails to achieve its vibration reduction in an efficient manner. Instead, the addition of such reinforcing structure causes new problems. In particular, the added reinforcing structure increases the weight of the turbine generator. The increased weight lessens the stiffness added by the stiffening structure.

Further, since base 10 and the generator housing are constructed independently of each other, transverse webs 24 of base 10 and the transverse webs of the generator housing are generally not in alignment; that is, although the webs are parallel to each other, they are generally offset with respect to each other. This further reduces the structural integrity of the turbine generator.

As will now be described, the present invention effectively detunes the resonant vibrations generated at the generator operating frequency and at twice the generator operating frequency, and thereby effectively reduces the resulting vibration. This is performed by reducing resonances in the vicinity of the generator operating frequency and at twice the generator operating frequency. At the same time, the present invention provides a turbine generator having a reduced size and weight, and improved structural rigidity and integrity, as compared with a conventional turbine generator using base 10. A weight reduction of from about 20 to about 25 percent may be achieved. In addition, the length of the turbine generator according to the present invention is substantially reduced.

Figure 2:
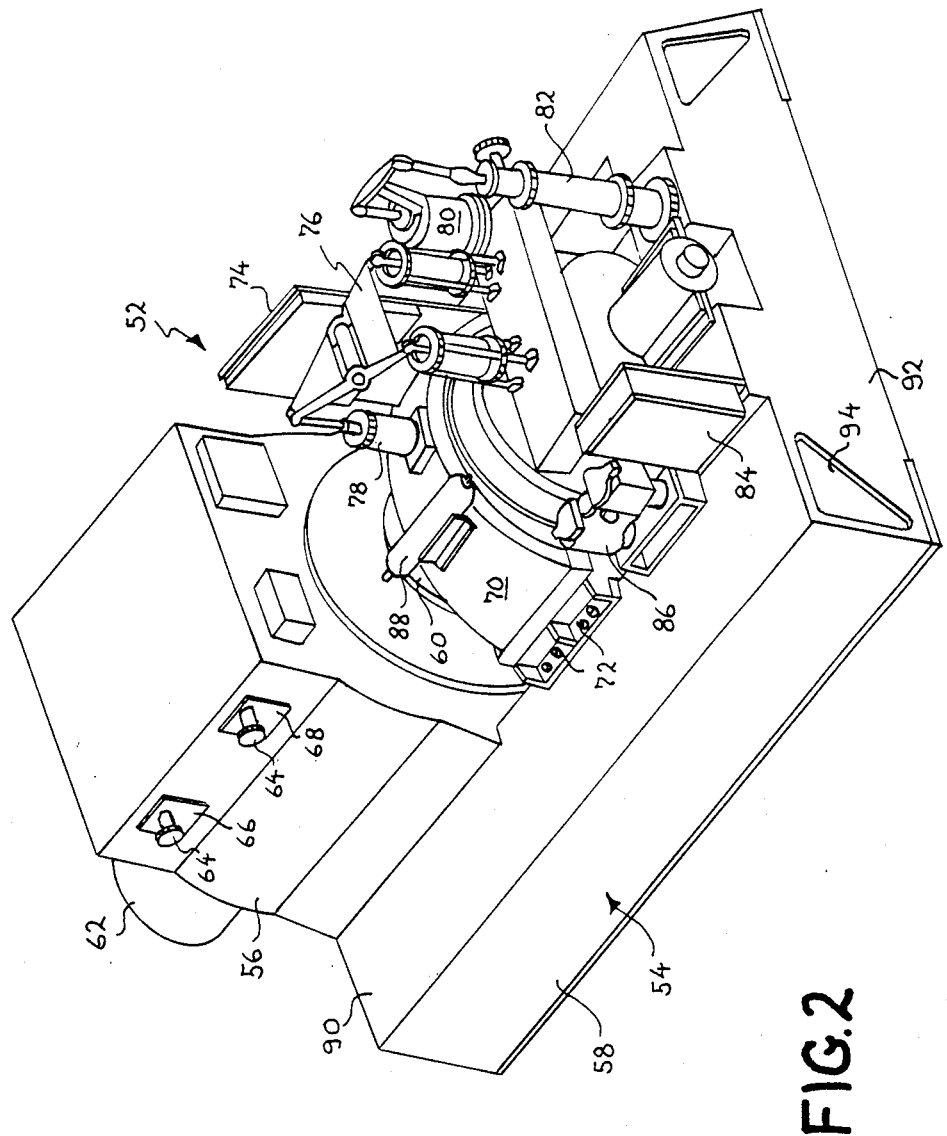
FIG. 2 is a perspective view of a turbine generator according to an embodiment of the present invention.

Referring now to FIG. 2, there is shown a turbine generator 52 according to the present invention. As shown, turbine generator 52 includes an integral generator housing-base 54 which, in turn, includes a generator housing 56 integrally or monolithically formed with a base 58, rather than generator housing 56 being bolted to base 58, as is conventional. A rotor 60, operatively associated with the stator, is rotationally mounted within generator housing 56 and extends outwardly therefrom, as shown. An exciter 62 is connected to one end of rotor 60 for supplying DC power to rotor 60. An air cooling structure 64 is positioned within the upper portion of generator housing 56 and extends outwardly therefrom at positions 66 and 68.

Base 58 is formed with a turbine opening 116 (shown more clearly in FIG. 5), as is conventional. A turbine 70 fits within the turbine opening and is bolted to base 58 thereat by mounting means, such as, for example, bolts 72 or the like. Turbine 70 includes a shaft (not shown) which is coupled to rotor 60 by a flexible coupling (not shown). The structure and operation of turbine 70 and associated parts are similar to known turbines. For example, a gage board 74, valve gear 76, valve gear operator 78, trip throttle valve 80, trip throttle valve operator 82, turbine control cabinet 84, oil filter 86 and accumulator 88, all of which are known, are associated with turbine 70, as shown.

Base 58 includes a walkway 90 extending along the length thereof, adjacent generator housing 56 and turbine 70, for servicing turbine generator 52. Walkway 90 is hollow, and accordingly, an end face 92 of base 58 is formed with a triangular cut-out section 94 through which a person can crawl to service the lower portions of turbine generator 52 not accessible from above.

Figure 3:
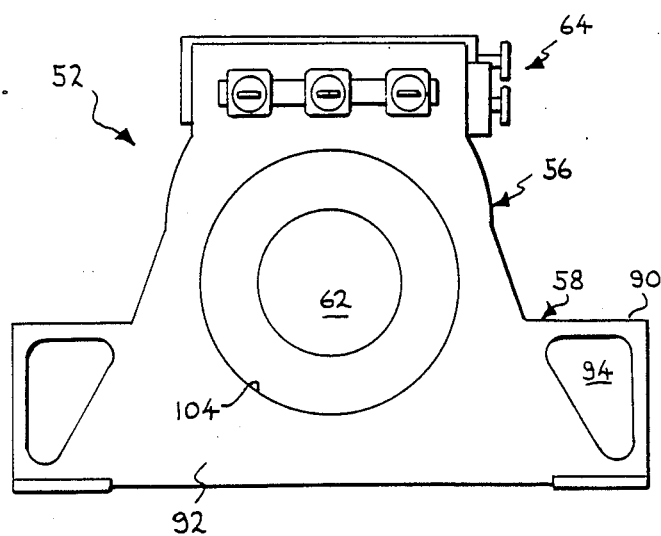
FIG. 3 is an end elevational view of a turbine generator according to the present invention.

Referring now also to FIG. 3, generator housing 56 of turbine generator 52 includes a central opening 104 through which its associated rotor 60 (FIG. 4) extends and which is surrounded by its associated stator (not shown).

Figure 4:
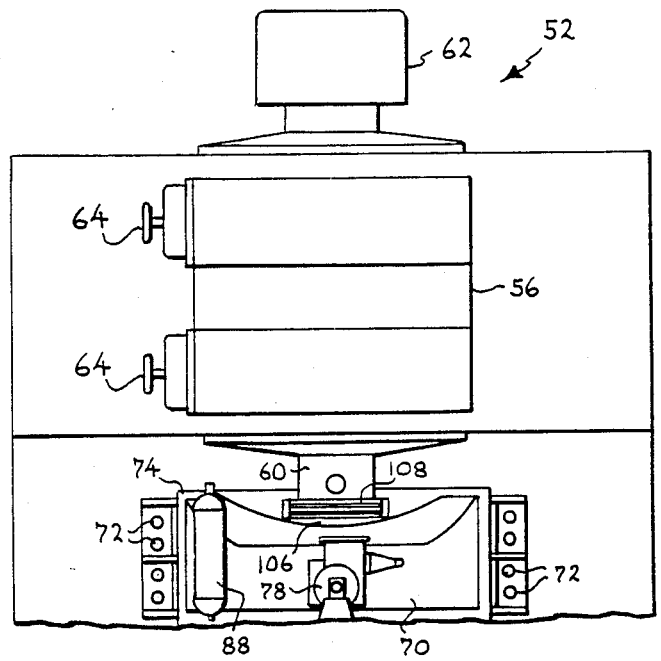
FIG. 4 is a top plan view of a portion of the turbine generator of FIG. 3, in partial break away.

Referring now to FIG. 4, rotor 60 is coupled to an associated turbine shaft 106 by means of a flexible coupling 108. The remaining elements of turbine generator 52 of FIG. 4 are identical to those already described with respect to FIGS. 3 and 4.

Figure 5:
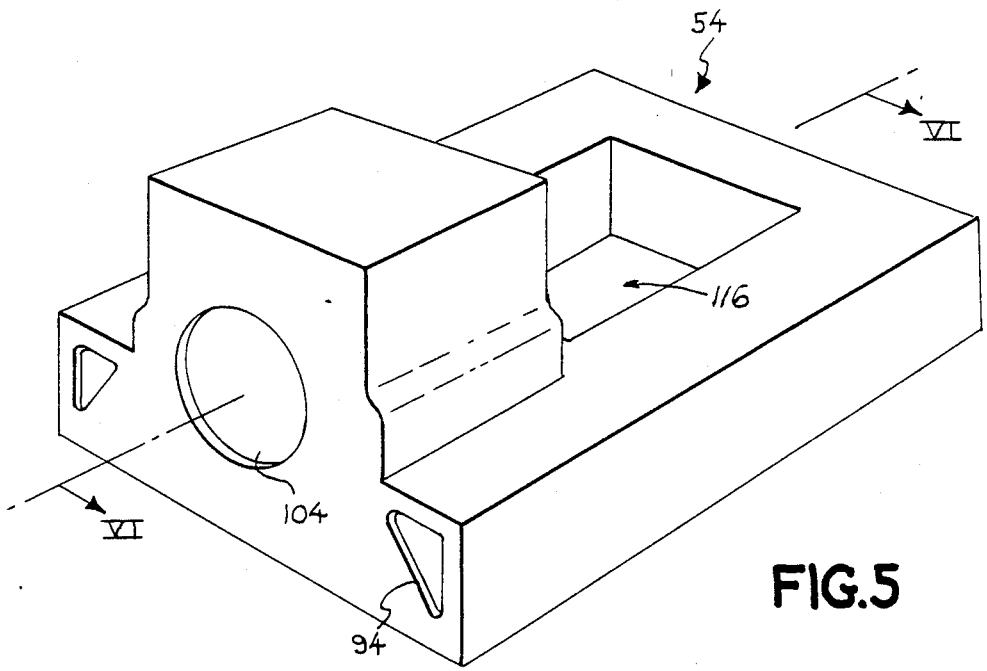
FIG. 5 is a perspective view of the integral generator housing-base of the turbine generator of FIG. 3.

Referring now to FIG. 5, integral generator housing-base 54 includes a turbine opening 116 within which turbine 70 is mounted.

Figure 6:
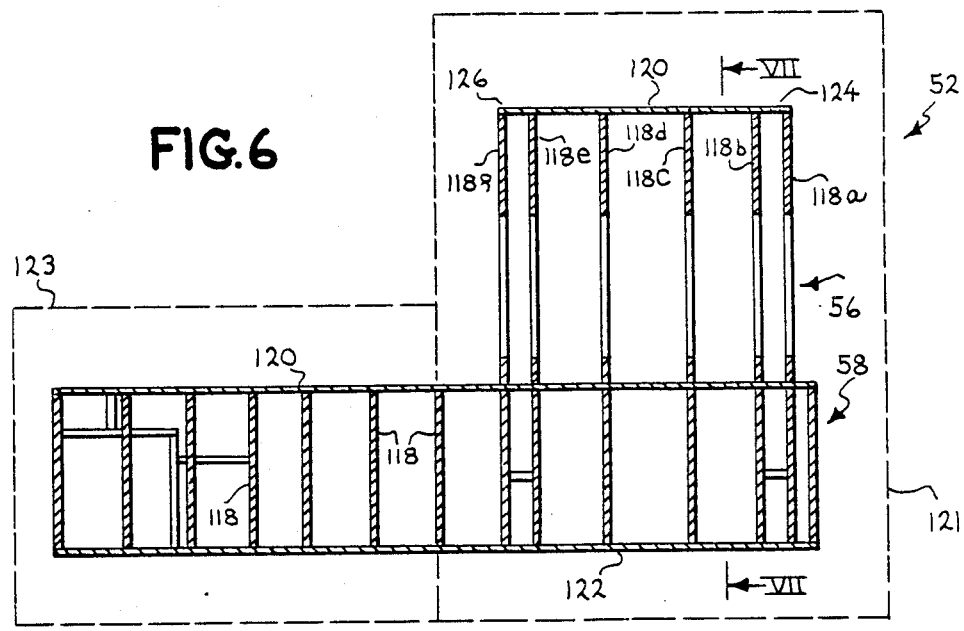
FIG. 6 is a cross-sectional view of the integral generator housing-base of FIG. 5, taken along line VI—VI thereof.

Referring now to FIG. 6, integral generator housing-base 54 is shown in longitudinal cross section, taken along line VII—VII of FIG. 5. Integral generator housing-base 54 is formed by a plurality of parallel and spaced transverse webs 118 interconnected by plates 120 welded thereto. As shown in the right side of FIG. 6, a first set of six spaced and parallel transverse webs 118a-f are disposed in a generator section 121 of integral generator housing-base 54. Transverse webs 118a-f extend from bottom 122 of base 58 of integral generator housing-base 54 to the top or upper end 124 of generator housing 56 thereof, and have a greater height than the remaining transverse webs 118 in a turbine section 123 of integral generator housing-base 54. Transverse webs 118a-f, along with respective interconnecting plates 120, integrally form both generator housing 56 and base 58.

Since the same transverse webs 118a-f are used to form both generator housing 56 and base 58, their alignment is assured, thus avoiding the weakness arising from the transverse webs of the base and generator housing being offset with respect to each other, as they are in the prior art. The structural integrity of turbine generator 52 thereby is improved. More importantly, the resonant vibrations in the corner-to-corner flapping mode are effectively eliminated. As a result, undesirable vibrations at the generator operating frequency and at twice the generator operating frequency are substantially reduced. At the same time, the size and weight of turbine generator 52 is greatly reduced, while increasing the structural rigidity and integrity, as compared to conventional turbine generators.

Figure 7:
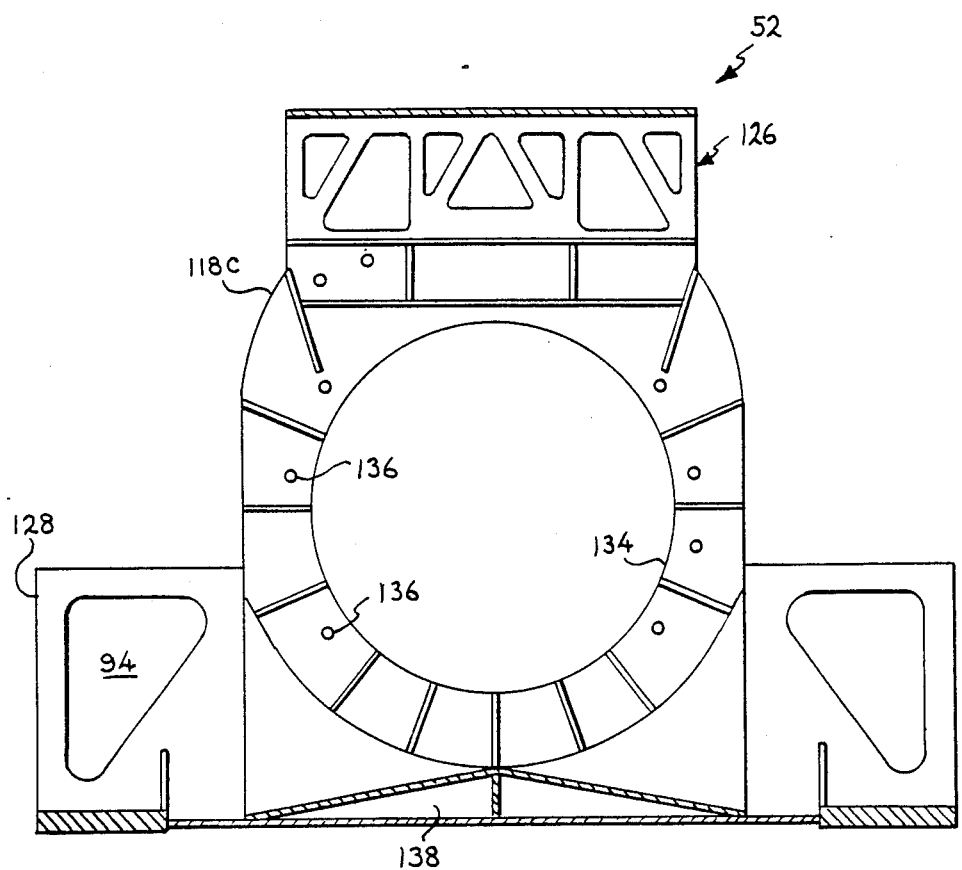
FIG. 7 is a cross-sectional view of the integral generator nousing-base of FIG. 6, taken along line VII—VII7 thereof.

Referring now to FIG. 7, transverse web 118c includes a superstructure lattice 126 at the upper end thereof, used primarily for air cooling of turbine generator 52, but which also operates to increase the rigidity thereof. Air cooling structure 64 (FIG. 3) is used in association with superstructure lattice 126. Transverse web 118c further includes a walkway flange 128 at each side for increasing structural rigidity and for supporting walkway 90.

Transverse web 118c also includes a centrally located, circular opening 134 through which a rotor 60 (not shown) extends. Transverse web 118c is also formed with a gusset 138 along the bottom thereof for reinforcing the web structure. The remaining transverse webs 118a, 118b, 118d, 118e and 118f are each of a similar configuration to transverse web 118c.

Although the present invention is directed to an illustrative embodiment including a single turbine generator 52, it should be clear to one skilled in the art that the teaching hereof could include corresponding structures for assembling two or more turbine generators into a unitary assembly for obtaining a greater amount of output power therefrom. Such an embodiment should be understood to fall within the spirit and scope of the invention.

Having described a specific preferred embodiment of the invention with reference to the accompanying drawings, it is to be appreciated that the present invention is not limited to that precise embodiment and that various changes and modifications may be effected therein by one of ordinary skill in the art without departing from the scope or spirit of the present invention as defined by the appended claims.

What is claimed is:

1. A turbine generator comprising:
   an integral generator housing-base including a base having a bottom and a generator housing having an upper end, said integral generator housing-base being formed by a plurality of spaced-apart transverse webs and plates interconnecting said transverse webs; a first set of said transverse webs extending from said bottom to said upper end to integrally form both said base and said generator housing;
   a turbine;
   means for mounting said turbine on said integral generator housing-base;
   a generator stator mounted within said generator housing; and
   said generator housing including means for permitting installation of a generator rotor coupled to said turbine and operatively associated with said generator stator.

2. A turbine generator according to claim 1 wherein said first set of said transverse webs supports said generator stator.

3. A turbine generator according to claim 1 wherein each transverse web of said first set includes a superstructure lattice for supporting air cooling structure.

4. A turbine generator according to claim 1 wherein each transverse web of said first set includes a walkway flange for defining a walkway of said turbine generator.

5. A turbine generator according to claim 1 wherein each transverse web of said first set includes a circular opening for admitting said generator rotor.

6. In a turbine generator of the type including a turbine; a generator stator and a generator rotor coupled to said turbine and operatively associated with said generator stator, an integral generator housing-base comprising:
   a base having a bottom;
   a generator housing having an upper end;
   said integral generator housing-base being formed by a plurality of spaced and parallel transverse webs and plates interconnecting said transverse webs; and
   a first set of said transverse webs extending from said bottom to said upper end to integrally form both said base and said generator housing.

7. An integral generator housing-base according to claim 6 wherein each transverse web of said first set includes a superstructure lattice for supporting air cooling structure.

8. An integral generator housing-base according to claim 6 wherein each transverse web of said first set includes a walkway flange for defining a walkway of said turbine generator.

9. An integral generator housing-base according to claim 6 wherein each transverse web of said first set includes a circular opening through which said generator rotor extends.

* * * * *